Figure 1:
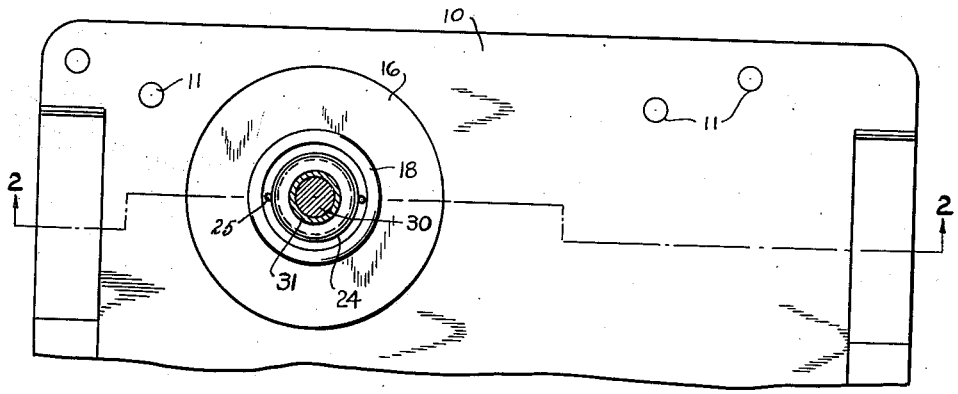

Sept. 3, 1940.                A. C. BORCHERS                2,213,333
                             BEARING CONSTRUCTION
                              Filed Dec. 3, 1937

INVENTOR.
Alwin Carl Borchers
BY
ATTORNEY.

Patented Sept. 3, 1940

2,213,333

UNITED STATES PATENT OFFICE 2,213,333

BEARING CONSTRUCTION

Alwin Carl Borchers, Elyria, Ohio, assignor to The General Industries Company, Elyria, Ohio, a corporation of Ohio Application December 3, 1937, Serial No. 177,935

2 Claims. (Cl. 308—134.1)

This invention relates to a bearing construction, and more particularly to a bearing structure which is self-lubricating over long periods with a given supply of lubricant.

It is highly desirable that certain types of bearings remain efficiently lubricated for long periods from an initial supply of lubricant due to the fact that they are relatively inaccessible for frequently replenishing the supply of lubricant and the fact that persons employing mechanisms utilizing this type of bearing are in a large degree unmindful of the necessity for proper lubrication. For example, relatively small bearings employed on phonograph mechanisms and the like should be supplied with lubricant at the factory and the lubricant should be so utilized as to efficiently lubricate the bearings for a relatively long period since the average person using mechanisms of this type is not sufficiently interested to insure lubrication at frequent intervals.

It has heretofore been proposed to supply lubricant to bearings of this type from a reservoir such as a lubricant saturated pad or the like in contact with the bearing. However, there is tendency for lubricant to be dissipated by oozing from the bearing and unless some means are provided for returning this lubricant to the reservoir, the entire supply is soon dissipated, additionally oil is spread on the mechanism parts which is highly undesirable in a phonograph or similar apparatus.

I have devised a bearing structure of this general type wherein an initial supply of lubricant may be provided and the lubricant will be continuously supplied to the reservoir resulting in efficient, proper lubrication of the bearing for a considerable period without replenishment of the lubricant. Additionally, the bearing structure consists of relatively few parts and is relatively inexpensive to manufacture and assemble.

It is an object of my invention, therefore, to provide an improved bearing structure whereby an initial supply of lubricant will be continuously re-used to efficiently lubricate the bearing for a considerable period.

Another object of my invention is to provide an improved self-lubricating bearing structure which can be economically manufactured and assembled.

Another object of my invention is to provide an improved self-lubricating bearing particularly adapted to phonograph mechanisms and the like, and wherein lubricant forced from the bearing is returned to the lubricant reservoir and prevented from contacting other parts of the mechanism.

Figure 2:
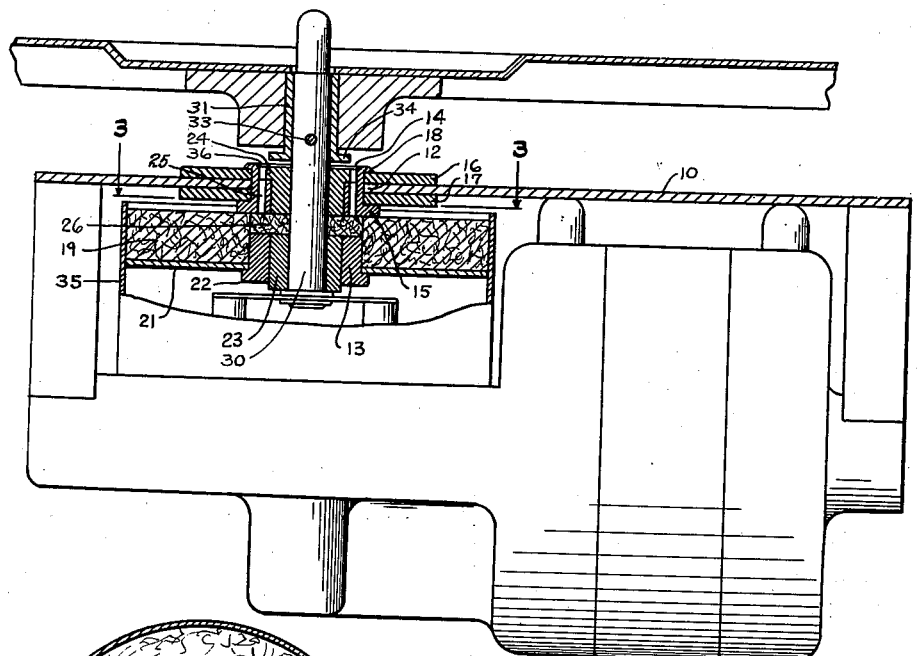
Figure 3:
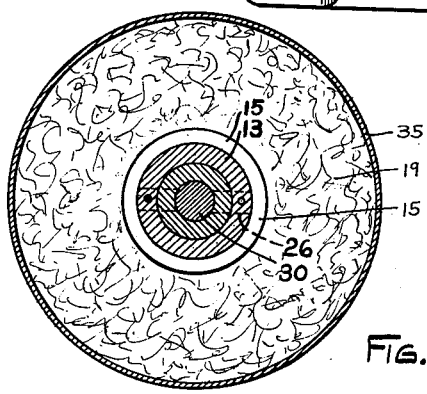

Other objects of my invention and the invention itself will become increasingly apparent from a consideration of the following description of the drawing wherein Fig. 1 is a plan view of a mounting plate employed in a phonograph mechanism embodying my invention, Fig. 2 is a section taken along the lines 2—2 of Fig. 1, and Fig. 3 is a section taken along line 3—3 of Fig. 2.

Referring now to the drawing, I have illustrated at 10 a mounting plate adapted to be associated with a phonograph cabinet or the like, but the use of the bearing structure to be hereafter described is not limited thereto and may be employed on various mechanisms. Plate 10 is secured to the cabinet in a conventional manner as by screws projected through perforations 11 in the plate and engaging portions of the cabinet. Plate 10 is provided with a relatively large perforation generally indicated at 12 to receive a housing element 13 for the bearing. Element 13 is provided with a cylindrical bore terminating upwardly in an enlarged bore 14 and is also provided with a radially extending external shoulder 15. A pair of discs 16 and 17 are centrally perforated to receive housing element 13, the discs being disposed above and below plate 10 respectively and the housing element 13 together with the discs 16 and 17 are locked in assembled relation with plate 10 by spinning over the upper end of housing element 13 to provide a gripping flange as indicated at 18. The shoulder 15 of housing element 13 abuts the lower disc 17, and the discs 16 and 17 reinforce the plate to provide a rigid mounting for the housing element and maintaining the housing element in proper axial alignment.

A relatively large felt or the like washer 19 encircles housing element 13 and abuts the lower face of shoulder 15 thereof, the washer 19 being adapted to be saturated with lubricant and act as a lubricant reservoir. To support the washer 19 I have provided a relatively stiff fiber washer 21 abutting the lower face of washer 19, the washers being maintained in place after being telescoped over housing element 13 by spinning over the lower portion of the housing element to form a gripping flange as indicated at 22.

Disposed within the housing element 13 is a bronze or the like tubular bearing 23 provided with a radially extending external flange 24 adapted to seat within the large bore 14 of the housing element. It will be noted that the flange axial walls are maintained spaced from the walls of bore 14 of the housing element to provide an annular recess or pocket therebetween for a purpose to be hereinafter described.

Substantially centrally of the housing element 13 and bearing 23 they are co-radially bored to receive wick elements 26 extending from the lubricant-saturated washer 19 to the inner walls of the bearing, the element 26 being formed of any suitable lubricant absorbing material. Holes 25 extend from the pocket formed intermediate bore 14 and flange 24 to wick elements 26.

As best illustrated in Fig. 3, a shaft 30, which in the present illustration is a turn-table shaft, is rotatably disposed within bearing 23, the shaft being suitably journaled at its lower end and having a sleeve 31 telescoped over the upper end of the shaft and maintained in assembled relation therewith by a pin 33 projected through the sleeve and shaft. The sleeve is preferably provided with a radially extending flange 34 at its lower end, slightly spaced at the top of bearing 23 and adapted to form a support for the turn-table which may also engage the pin 33 for effecting rotary movement of the turn-table. The particular function of the shaft 30 constitutes no essential part of my invention and the shaft may be employed for various purposes other than that described. I preferably provide a circular housing member 35 encasing washer 19 and abutting the lower face of plate 10 to prevent the ingress of foreign material to the bearing parts. The housing member 35 may comprise part of a housing for transmission mechanism and motor.

It will now be understood that lubricant saturated washer 19 will transmit lubricant through the wick elements 26 to the interior of the bearing to lubricate the shaft and I have found that when the shaft is rotating there is a tendency for lubricant to be carried upwardly intermediate the shaft and the inner walls of the bearing and be received on the top horizontal face of the bearing. The lubricant will then travel outwardly over the top face of the bearing and over a beveled peripheral edge of the bearing indicated at 36 and be received in the annular pocket intermediate flange 24 of the bearing and the walls of enlarged bore 14 of housing element 13. The lubricant will then seep downwardly through holes 25 to be absorbed by the wick elements 26 and re-supplied to the interior of the bearing. Thus, the lubricant travels in a continuous path with negligible waste and is continuously re-used so that the bearing may be efficiently lubricated for a considerable period of time by the initial supply of lubricant carried by the saturated felt or the like washer 19.

I find that there is little if any tendency for the lubricant to travel downwardly and be forced from the lower part of the bearing.

Although I have shown and described a preferred form of my invention, I contemplate that numerous and extensive departures may be made therefrom without departing from the spirit of my invention or the scope of the appended claims.

Having thus described my invention, what I claim is:

1. A self-lubricant bearing structure adapted to be rigidly secured to a perforated plate, said structure comprising a generally tubular housing element having a shoulder adapted to be disposed beneath the plate and a portion projecting upwardly through the plate perforation adapted to be flanged radially to rigidly secure the housing to the plate, the upper portion of the housing being provided with an enlarged bore, a generally tubular bearing element disposed within the housing having a radially outwardly extending flange whereby the bearing is supported by said flange engaging the shoulder formed by the enlarged housing bore, the bearing flange being spaced from the bore walls to provide a recess therebetween, wick elements projecting through the housing and bearing to transmit lubricant to the bearing interior, a relatively large lubricant absorbing washer encircling the housing and engaging the wick elements, the housing being provided with a lower radially outwardly extending flange whereby the washer may be supported between the housing shoulder and lower flange, communicating means in the housing element extending from the recess to the wick elements, and the bearing being adapted to receive a generally vertically disposed shaft whereby lubricant transmitted from the washer by the wick elements to the shaft and thence to the upper face of the bearing to the recess may be returned to the wick elements.

2. A self-lubricant bearing structure adapted to be rigidly secured to a perforated plate, said structure comprising a generally tubular housing element having a shoulder adapted to be disposed beneath the plate and a portion projecting upwardly through the plate perforation adapted to be flanged radially to rigidly secure the housing to the plate, the upper portion of the housing being provided with an enlarged bore, a generally tubular bearing element disposed within the housing, said bearing element having an outwardly extending flange formed by the enlarged housing bore spaced from the bore walls to provide a recess therebetween and engaging the shoulder, wick elements projecting through the housing and bearing to transmit lubricant to the bearing interior, a relatively large lubricant absorbing washer encircling the housing and engaging the wick elements, communicating means in the housing element extending from the recess to the wick elements and the bearing being adapted to receive a generally vertically disposed shaft whereby lubricant transmitted from the washer by the wick elements to the shaft and thence to the upper face of the bearing to the recess may be returned to the wick elements.

ALWIN CARL BORCHERS.